(12) United States Patent
Park

(10) Patent No.: US 11,747,718 B2
(45) Date of Patent: *Sep. 5, 2023

(54) CAMERA MODULE

(71) Applicant: LG INNOTEK CO., LTD., Seoul (KR)

(72) Inventor: Je Kyung Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,289

(22) Filed: Nov. 22, 2021

(65) Prior Publication Data

US 2022/0082906 A1     Mar. 17, 2022

Related U.S. Application Data

(63) Continuation of application No. 16/765,716, filed as application No. PCT/KR2018/014933 on Nov. 29, 2018, now Pat. No. 11,221,543.

(30) Foreign Application Priority Data

Nov. 29, 2017 (KR) .................. 10-2017-0161786

(51) Int. Cl.
*H04N 23/51* (2023.01)
*H04N 23/52* (2023.01)
(Continued)

(52) U.S. Cl.
CPC ............ *G03B 17/55* (2013.01); *G03B 17/12* (2013.01); *G03B 30/00* (2021.01); *H04N 23/51* (2023.01);
(Continued)

(58) Field of Classification Search
CPC ............... H04N 5/2251; H04N 5/2252; H04N 5/22521; H04N 5/2254; H04N 23/51;
(Continued)

(56) References Cited

U.S. PATENT DOCUMENTS

| 10,894,275 B2 | 1/2021 | Byrne et al. |
| 2006/0171704 A1 | 8/2006 | Bingle et al. |
| 2010/0097519 A1 | 4/2010 | Byrne et al. |
| 2011/0249120 A1 | 10/2011 | Bingle et al. |

(Continued)

FOREIGN PATENT DOCUMENTS

| CN | 1845333 A | 10/2006 |
| CN | 206228375 U | 6/2017 |

(Continued)

*Primary Examiner* — Daniel M Pasiewicz
(74) *Attorney, Agent, or Firm* — Birch, Stewart, Kolasch & Birch, LLP

(57) ABSTRACT

The present invention relates to a camera module. A camera module according to one aspect comprises: a lens barrel in which a lens part is disposed; a substrate part including a substrate that is disposed below the lens barrel; a housing coupled to the lens barrel; and a heating member electrically connected to the substrate part, wherein the lens barrel includes a first region in which a lens is disposed and a second region disposed spaced apart from the first region, and the heating member is disposed between the first region and the second region.

19 Claims, 4 Drawing Sheets

(51) Int. Cl.
*H04N 23/55* (2023.01)
*G03B 17/55* (2021.01)
*G03B 17/12* (2021.01)
*G03B 30/00* (2021.01)
*H04N 23/57* (2023.01)

(52) U.S. Cl.
CPC ............. *H04N 23/52* (2023.01); *H04N 23/55* (2023.01); *H04N 23/57* (2023.01)

(58) Field of Classification Search
CPC ........ H04N 23/52; H04N 23/55; H04N 23/57; H05B 3/06; H05B 3/141; H05B 3/26; H05B 3/84; G02B 27/0006; G03B 17/55
See application file for complete search history.

(56) References Cited

U.S. PATENT DOCUMENTS

| | | |
|---|---|---|
| 2012/0170119 A1 | 7/2012 | Chu et al. |
| 2018/0176431 A1 | 6/2018 | Kim et al. |
| 2019/0033690 A1 | 1/2019 | Choi |
| 2019/0113743 A1 | 4/2019 | Kumar |
| 2019/0137850 A1* | 5/2019 | Ha .................. G02B 7/022 |

FOREIGN PATENT DOCUMENTS

| | | |
|---|---|---|
| JP | 2011-130315 A | 6/2011 |
| JP | 2015-14581 A | 1/2015 |
| KR | 10-2011-0068442 A | 6/2011 |
| KR | 10-2012-0044667 A | 5/2012 |
| KR | 10-1376882 B1 | 3/2014 |
| KR | 10-2017-0023664 A | 3/2017 |
| WO | WO 2016/164173 A1 | 10/2016 |
| WO | WO 2016/195403 A1 | 12/2016 |

* cited by examiner

CAMERA MODULE

CROSS REFERENCE TO RELATED APPLICATIONS

This application is a continuation of U.S. application Ser. No. 16/765,716, filed May 20, 2020, which is the National Phase of PCT International Application No. PCT/KR2018/014933, filed on Nov. 29, 2018, which claims priority under 35 U.S.C. 119(a) to Patent Application No. 10-2017-0161786, filed in the Republic of Korea on Nov. 29, 2017, all of which are hereby expressly incorporated by reference into the present application.

TECHNICAL FIELD

The teachings in accordance with exemplary and non-limiting embodiments of this invention relate generally to a camera module.

BACKGROUND ART

Concomitant with recent popularization of automobiles, the automobiles have been rapidly spread to various strata of people and ages.

An automobile is mounted with a black box camera for protection of the automobile or obtainment of objective data of traffic accidents, and a rear monitoring camera for securing safety of the automobile at the time of backing-up by monitoring, by a driver, a blind spot (dead zone) of the automobile through a screen.

A camera may include a lens module, a lens holder supporting the lens module, and an image sensor converting an image of an object collected by the lens module to an electric signal. A housing forming an outer shape of the camera is configured to be tightly-shielded in an entire area in order to prevent inner parts from being contaminated by foreign objects including moisture.

In light of the fact that automobiles are characteristically operated outdoors, inner and outer temperatures of an automobile may be formed in variable distributions depending on seasons and timings. For example, an inner temperature may be formed to be higher than an outer temperature in summer, and may drop below zero in winter. Hence, elements including lens and glass of a camera may be formed with frostiness (condensation phenomenon) in response to rapid changes in temperatures. As a result, disadvantages may be generated including obtainment of unsatisfactory photographic materials, and failure of product.

In order to solve these disadvantages, a method has been proposed to remove frosts by arranging a hot wire on a lens and a glass to allow heat to be transmitted to the lens and the glass. However, because of narrow spatial characteristics to conform to the trend of miniaturization of a camera, there is a limitation in arranging a hot wire and elements for supplying a power to the hot wire. Moreover, a lens exposed to outside or a hot wire connected to glass require a separate waterproof structure to disadvantageously increase the number of parts and an entire volume of product.

DETAILED DESCRIPTION OF THE INVENTION

Technical Subject

It is an object of the present exemplary embodiment to provide a camera module configured to reduce the number of parts and an entire size of a product and to prevent frostiness (condensation phenomenon) including frosts from being formed on a lens.

Technical Solution

In one general aspect of the present invention, there is provided a camera module, comprising:
a lens barrel in which a lens part is disposed;
a substrate part including a substrate that is disposed below the lens barrel; a housing coupled to the lens barrel; and
a heating member electrically connected to the substrate part, wherein the lens barrel includes a first region in which a lens is disposed and a second region so disposed as to be spaced apart from the first region, and wherein
the heating member is disposed between the first region and the second region.

The camera module may include a base connecting the first region and the second region.

The lens part may include a first lens and a second lens, wherein the lens barrel may include a protrusion region protruded from the base to an opposite direction of the first region disposed with the second lens and disposed with the first lens.

The second region may include a lateral wall shape encompassing the first region.

The heating member may be so disposed as to encompass the lens.

A height of the heating member may be lower than that of the first region.

A lower surface of the first region may be spaced apart from the substrate part.

A lower surface of the first region may be spaced apart from the substrate part.

A part of the second region may be disposed inside the housing.

The heating member may include a resistor.

The second region may include a protrusion-shaped rib formed at an outside of the lateral wall shape.

The lens barrel may include a guide protrusively formed from the base to a first direction, and a part of the guide may be coupled to a groove formed on the housing.

Advantageous Effects

The exemplary embodiment of the present invention has an advantage in that a lens barrel and a lens part are formed in an integrated module, and a heating member is disposed on an outer circumferential surface of a lens reception part accommodating a lens part to thereby simplify a structure for prevention of frostiness (condensation phenomenon).

Particularly, the exemplary embodiment of the present invention has an advantage over the prior art in that a separate cover for arrangement of heating structure or a case is dispensed with to thereby reduce the number of parts.

Moreover, another advantage is that a heating member and a power supplier for providing the power to the heating member are disposed at an inside space of a housing to dispense with a separate waterproof structure.

Furthermore, still another advantage is that a substrate module disposed with an image sensor and a lens part are so disposed as to face each other, and a power provider and a heating member are disposed at an edge region thereof to enable to obtain a broader space in disposition of parts.

BEST MODE

Figure 1:
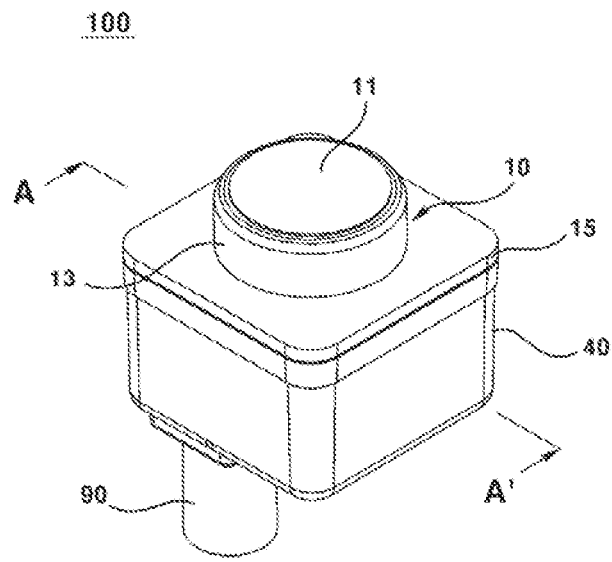
FIG. 1 is a perspective view of a camera module according to an exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings.

In describing elements in the exemplary embodiments of the present invention, the terms, first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

Figure 2:
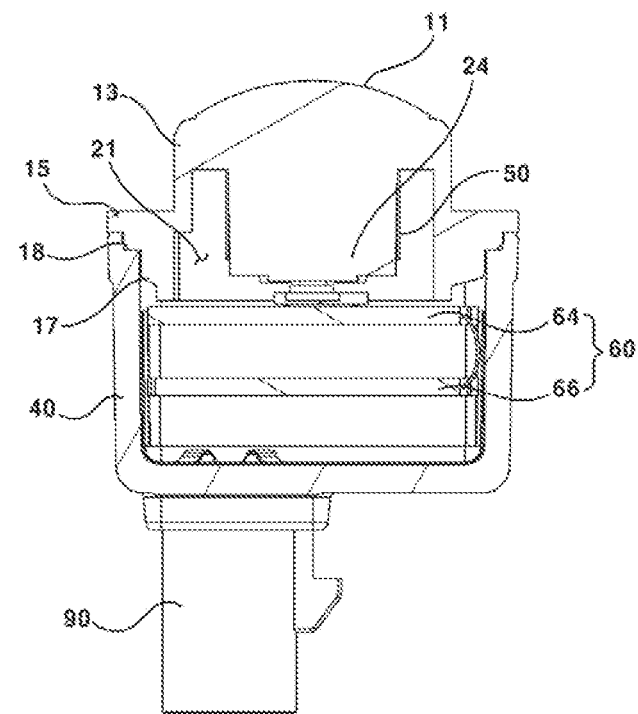
FIG. 2 is a cross-sectional view of a camera module according to an exemplary embodiment of the present invention.
Figure 3:
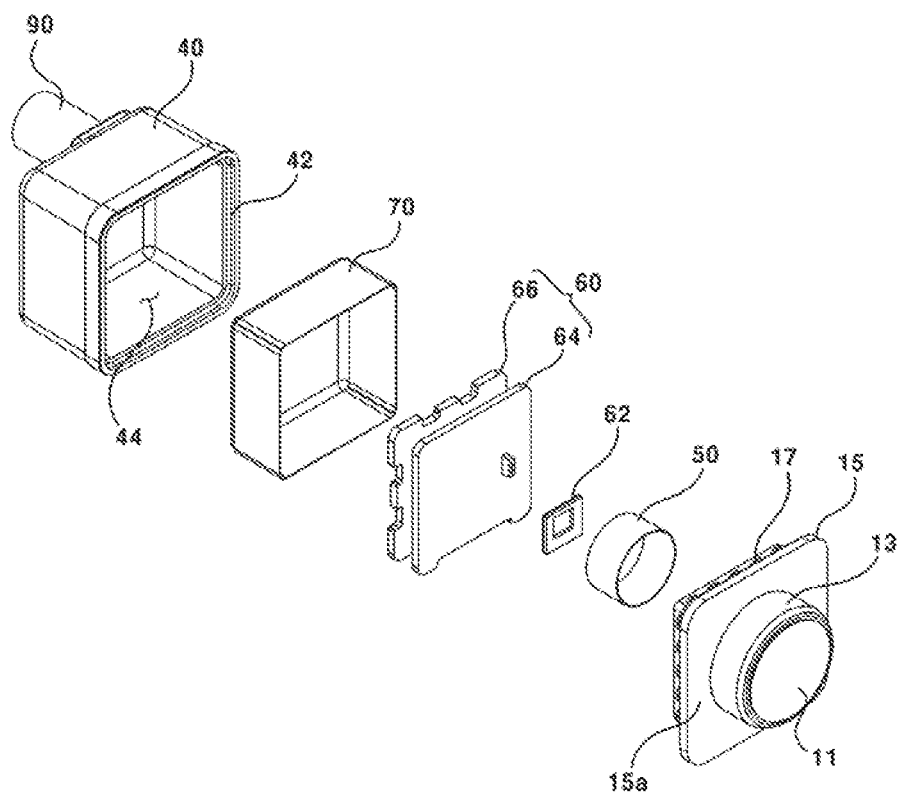
FIG. 3 is an exploded perspective view of a camera module according to an exemplary embodiment of the present invention.
Figure 4:
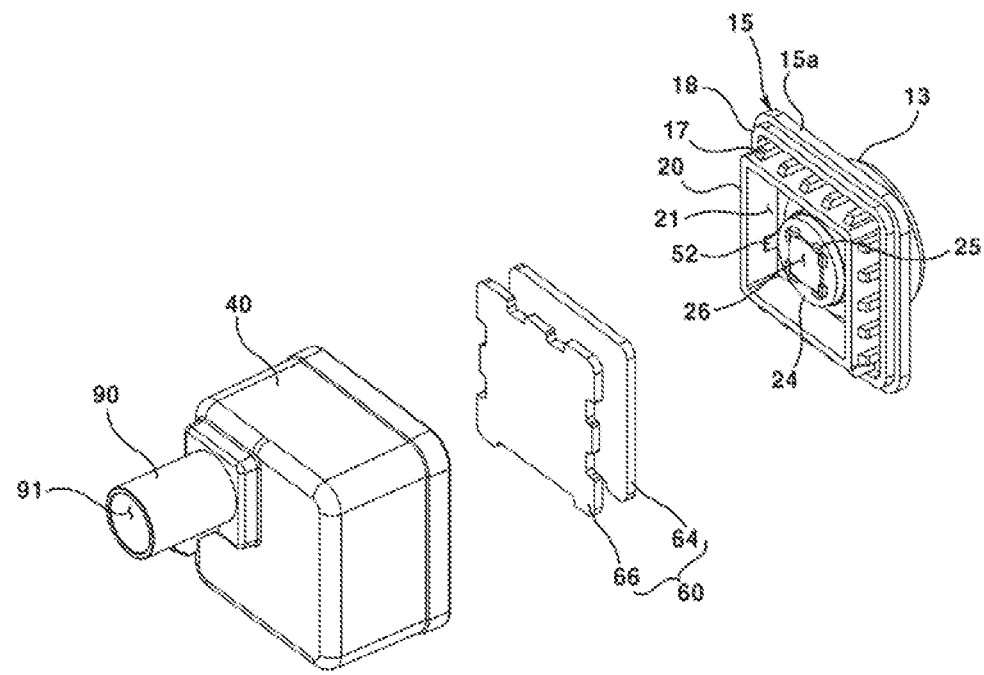
FIG. 4 is an exploded perspective view of a camera module illustrated at a different angle according to an exemplary embodiment of the present invention.

FIG. 1 is a perspective view of a camera module according to an exemplary embodiment of the present invention, FIG. 2 is a cross-sectional view of a camera module according to an exemplary embodiment of the present invention, FIG. 3 is an exploded perspective view of a camera module according to an exemplary embodiment of the present invention, and FIG. 4 is an exploded perspective view of a camera module illustrated at a different angle according to an exemplary embodiment of the present invention.

Referring to FIGS. 1 to 4, a camera module (100) according to an exemplary embodiment of the present invention may include a housing (40), and a lens module (10) coupled to the housing (40).

The housing (40) may substantially take a square shape in a cross-section thereof, and may be formed therein with an inner space (44) to accommodate one or more electronic parts. The electronic parts disposed in the inner space (44) may include a substrate part (60) mounted with an image sensor (62) and a shield can (70) encompassing the substrate part (60).

The lens module (10) may include a lens barrel (15) and a lens part (11) accommodated into the lens barrel (15). To be more specific, the lens barrel (15) may include a base region (15a) extended to a direction perpendicular to an optical axis, a first lens reception part (13) protruded upwardly from an upper surface of the base (15a) to accommodate therein the lens part (11), a partition part (20) protruded downwardly from a lower surface of the base (15a) to accommodate therein a space part (21) and a second lens reception part (24).

Furthermore, the lens part (11) may include a first lens and a second lens.

The first lens reception part (13) may be called a protrusion region in terms of the fact that the first lens reception part (13) is upwardly protruded relatively over other regions. Furthermore, the protrusion region may be disposed with the first lens. Moreover, the second lens may be disposed in the second lens reception part (24).

The lens barrel (15) and the housing (40) may be hook-coupled. To this end, the lens barrel (15) may be formed with a rib (17) protruded downwardly from a lower surface of the base (15a). The rib (17) may be disposed at an outer circumferential surface of the partition part (20). The lens barrel (15) may be disposed with a guide (18) protruded from a lower surface of the base (15a) to arrange the rib (17) at an inside thereof. The guide (18) may be disposed at an outside of the partition part (20). Therefore, the rib (17) may face an external surface of the partition part (20), and the external surface may face an internal surface of the guide (18). A protruding height of the guide (18) may be formed to be lower than that of the partition part (20). In addition, the rib (17) may be disposed at an outer circumferential surface of the partition part (20) to prevent the partition part (20) from being bent or deformed.

The rib (17) may be formed in a plural number, and may be so disposed as to be mutually spaced apart along an external surface of the partition part (20).

Meantime, the lens barrel (15) may be formed with a non-conductive metal.

The partition part (20) may be disposed at an inside of the housing (40) when the housing (40) and the lens module (10) are coupled, and an inside of the partition part (20) may be disposed with a second lens reception part (24). Furthermore, the second lens reception part (24) may be formed with a space part (21) in order to be spaced apart from an inner surface of the partition part (20).

In other words, when the second lens reception part (24) disposed with a lens is called a first region, an outside of the first region may be disposed with a second region. Furthermore, the space part (21) may be interpreted as a groove interposed between the first region and the second region. In other word, the second region may encompass the first region, and the groove may be formed along the first region and the second region.

Hereinafter, the first region may mean the second lens reception part (24), the second region may mean the partition part (20), and the space part (21) may mean the groove respectively, and these meanings may be interchangeably used for convenience of explanation. Meantime, the first region may be disposed with a cavity in which a lens is inserted.

An inside of the housing (40) may be formed with a rib groove (42) in which the rib (17) is received. The rib groove (42) may be disposed at a relatively upper side of the inside of the housing (40). When the lens module (10) is coupled to the housing (40), the rib (17) may be accommodated into the rib groove (42). Furthermore, the rib groove (42) may accommodate the guide (18) to allow the lens barrel (15) to be coupled with the housing (40).

An end region of the rib (17) may be protrusively formed with a hitching part to be hitched by the rib groove (42). When the lens module (10) and the housing (40) are coupled, a region disposed underneath based on the base (15a) may be disposed on an inner space (44) formed inside the housing (40). As a result, only a lateral surface of the base (15a) may be exposed to an outside.

A lower surface of base (15a) may be disposed with a second lens reception part (24) downwardly protruded from a lower surface of base (15a) to be received into the space part (21). The second lens reception part (24) may be formed therein with a lens reception space into which the lens part (11) is received. Furthermore, an inside of the first lens reception part (13) disposed at an upper surface of base (15a) may be also formed with a lens reception space into which the lens part (11) is received. The inside of the first lens reception part (13) and the inside of the second lens reception part (24) may be mutually communicated. A cross-sectional area of the second lens reception part (24) may be formed to be smaller than that of the first lens reception part (13).

The lens part (11) may include at least one lens in order to collect an image of external subject. The lens part (11) may be disposed with a plurality of lenses each spaced apart to upper/lower directions. The lens part (11) may be disposed in a lens reception space formed at an inside of the first lens reception part (13) and at an inside of the second lens reception part (24). Furthermore, the plurality of lenses disposed at the lens reception space may be so disposed as to be arranged with a lens having a relatively smaller cross-section toward a lower side. Meantime, a cross-section of the first lens reception part (13) and a cross-section of the second lens reception part (24) may be formed with a circular shape.

The substrate part (60) may be disposed at an inner space (44) of the housing (40). The substrate part (60) may include a first substrate (64), and a second substrate (66) disposed at a lower side of the first substrate (64).

The first substrate (64) may be disposed at a lower side of the second lens reception part (24). A lower surface of the first substrate (64) and a lower surface of the second lens reception part (24) may face each other. An upper surface of the first substrate (64) may be disposed with an image sensor (26) arranged on an optical axis of the lens part (11). The image sensor (26) may be so disposed as to form an optical axis with the lens part (11) to allow obtaining a photographic material by converting an image of subjects collected on the lens part (11) to an electric signal.

Meantime, based on an upper surface of the substrate part (60), a lower surface of the first region may be positioned to be higher than that of the second region. Furthermore, a lower surface of the first region may be spaced apart from the substrate part (60), and a lower surface of the second region may be brought into contact with the substrate part (60). If necessary, an adhesive member may be interposed between the second region and the substrate part (60).

A lower surface of second lens reception part (24) may be formed with a sensor reception part (26) to allow the image sensor (26) to be received. The image sensor reception part (26) may be recessed upwardly over other regions. The sensor reception part (26) may be so disposed as to match a cross-sectional shape of the image sensor (26). An edge region of the sensor reception part (26) may be disposed with a guide rib (25) dividing the other region of lower surface of the second lens reception part (24) from the sensor reception part (26). The guide rib (25) may be protrusively formed from an edge region of the image sensor reception part (26) toward a lower side of the second lens reception part (13) in order to support a lateral surface of the image sensor (26). The guide rib (25) may be disposed in a plural number along an edge region of the image sensor (26), each spaced apart from the other. Hence, an upper surface of image sensor (26) may be disposed on a reception surface of the sensor reception part (26), and a lower surface may be mounted on an upper surface of the first substrate (64). Furthermore, a region formed with the sensor reception part (26) on the lower surface of the second lens reception part (24) may be an area matching to the lens part (11) to an optical axis direction when the image sensor (26) is to be coupled.

The second substrate (66) may be disposed at a lower side of first substrate (64). The first substrate (64) may be disposed with the second substrate (66) spaced apart to an upper and lower direction. The first substrate (64) may be electrically connected to the second substrate (66). The first substrate (64) and the second substrate (66) may be electrically connected through an FPCB. The second substrate (66) may be connected to a connector (not shown). The connector may be coupled at one end to a lower surface of second substrate (66) and may be exposed at the other end to an outside. Toward this end, a lower surface of housing (40) may be formed with a connector terminal (90) in order to expose the connector to the outside. The connector terminal (90) may be formed at an inside with a terminal hole (91), and may be exposed to the connector and the outside through the terminal hole (91).

Meantime, as shown in FIG. 2, a shape of one edge and a shape of the other edge on an upper surface of lens barrel (15) according to an exemplary embodiment of the present invention may be mutually different. This is because a contact position of the first substrate (64) and that of the second substrate (66) are mutually different.

To be more specific, based on FIG. 2, the FPCB may be attached to a right side of the first substrate (64). The lens barrel (15) must be attached relatively to a more inner side on the first substrate (64) than the FPCB. Furthermore, a left side of the first substrate (64) may be a region where the FPCB is not attached. Thus, in order for the lens barrel (15) to be attached to an edge region instead of an inner side region of the first substrate (64), a groove is structurally formed to an outside of the lens barrel (15) which is not a straight line. Therefore, an upper edge region of the lens barrel (15) may include regions each having a different shape.

Figure 5:
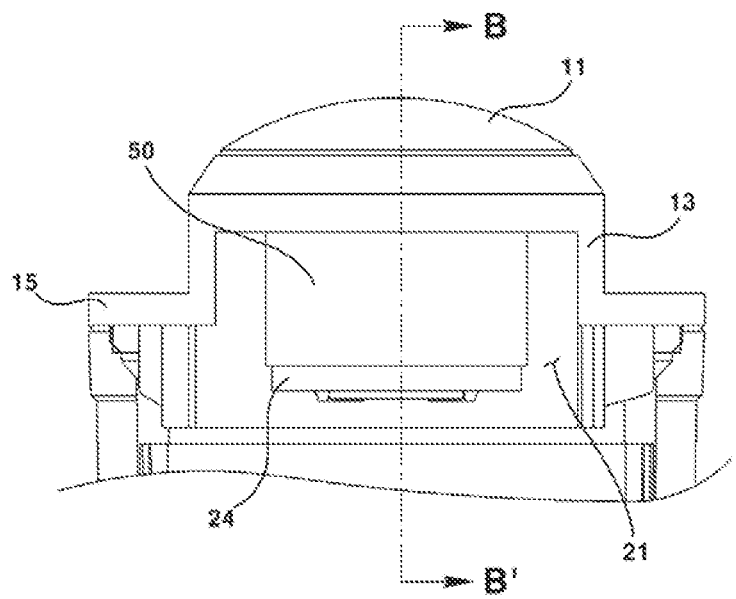
FIG. 5 is a cross-sectional view taken along line A-A' of FIG. 1.
Figure 6:
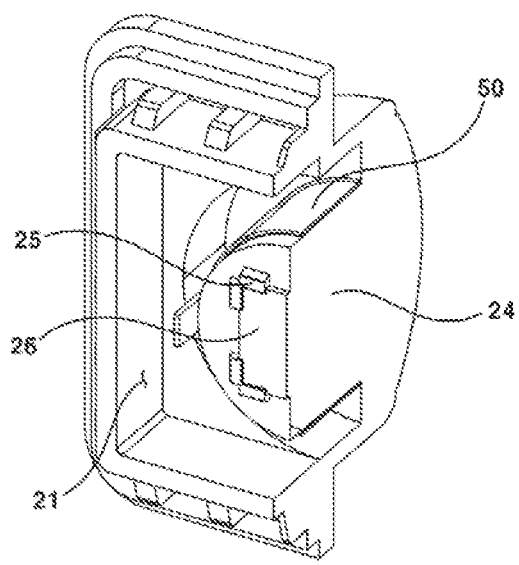
FIG. 6 is a cross-sectional view taken along line B-B' of FIG. 4.

FIG. 5 is a cross-sectional view taken along line A-A' of FIG. 1, and FIG. 6 is a cross-sectional view taken along line B-B' of FIG. 4.

Referring to FIGS. 2 to 6, an outer circumferential surface of the second lens reception part (24) may be disposed with a heating member (50). The heating member (50) is a heating body generating a heat by receiving a power, where the generated heat may be transmitted to the lens part (11) to prevent the lens part (11) from being formed with the frostiness. The heating member (50) may be interpreted to be disposed on a groove between the first region and the second region. Furthermore, the heating member (50) may be shorter in a length to direction parallel with an optical axis than a length of the said groove.

The heating member (50) may be a plate-shaped heating sheet corresponding to an outer cross-section of the second lens reception part (24). At this time, the outer circumferential surface of the second lens reception part (24) may be encompassed by allowing one end and the other end of the heating sheet to be mutually joined. This is to be interpreted as the heating member (50) having a shape to encompass the lens.

In another example, the heating member (50) may include one or more hot wires. The said more than one hot wire may be spirally wound on an outer circumferential surface of the second lens reception part (24) to allow the more than one hot wire to be mutually spaced apart, whereby the lens part (11) may be transmitted with a heat.

The heating member (50) may be a transparent electrode. The transparent electrode may be an element to generate a heat by receiving a power and may be a transparent heating membrane coated with a conductive ITO (Indium Thin Oxide) configured to generate a heat using an intrinsic resistance component. However, the ITO is simply an exemplary and it should be interpreted that any material of transparent electrode configured to generate a heat by being electrically connected may be applied thereto.

As illustrated in FIG. 4, the heating member (50) may receive the power from a power supplier (52). The power supplier (52) may be electrically connected at one end to the heating member (50), and electrically connected at the other end to first substrate (64). Thus, the power applied from an outside through a connector may be provided to the second substrate (66) and to the heating member (50) passing through the second substrate (66). In short, the heating member (50) may be a resistance in which a current from the substrate part (60) flows.

As a result, the heat generated from the heating member (50) may be transmitted to the lens part (11) disposed at an inside of the second lens reception part (24) and prevent the frostiness from being formed on the lens part (11). It should be apparent that the heat generated from the heating member (50) is transmitted to the lens part (11) disposed at an inside of the first lens reception part (13).

According to the abovementioned configuration, the lens barrel and the lens part are integrally formed in one integral module, and a heating member is disposed at an outer circumferential surface of the lens reception part accommodating the lens part to advantageously prevent the frostiness in a simple structure. Particularly, there is no need of a separate cover or a separate cover for arranging a heating structure unlike the prior art to advantageously reduce the number of parts.

Furthermore, a heating member and a power supplier for providing a power to the heating member are disposed at an inner space of a housing to advantageously dispense with a separate waterproof structure. Still furthermore, a substrate module disposed with an image sensor are made to face a lens part and a power supplier and a heating member are disposed at an edge thereof to advantageously secure a broader space in arranging parts.

Although the present disclosure has been explained with all constituent elements forming the exemplary embodiments of the present disclosure by being combined in one embodiment, or by being operated in one embodiment, the present disclosure is not limited thereto. That is, all elements may operate by allowing one or more elements to be selectively combined as long as within the scope of object of the invention. Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The invention claimed is:

1. A camera module comprising:
a lens module;
a housing coupled to the lens module;
a substrate part disposed between the lens module and the housing; and
a heating member disposed on a portion of the lens module,
wherein the lens module includes:
a base disposed on an upper surface of the housing;
a first lens accommodating part protruding upward from an inner surface of the base;
a second lens accommodating part protruding downward from a lower surface of the first lens accommodating part; and
a lens part disposed inside the first lens accommodating part and the second lens accommodating part,
wherein the heating member is disposed on an outer circumferential surface of the second lens accommodating part,
wherein a sensor seating portion is disposed on a lower surface of the second lens accommodating part, and
wherein an image sensor is spaced from the substrate part and located in the sensor seating portion.

2. A camera module comprising:
a lens module;
a housing coupled to the lens module;
a substrate part disposed between the lens module and the housing; and
a heating member disposed on a portion of the lens module,
wherein the lens module includes:
a base disposed on an upper surface of the housing;
a first lens accommodating part protruding upward from an inner surface of the base;
a second lens accommodating part protruding downward from a lower surface of the first lens accommodating part; and
a lens part disposed inside the first lens accommodating part and the second lens accommodating part,
wherein the heating member is disposed on the second lens accommodating part, and
wherein the base includes a partition wall disposed outside the second lens accommodating part to encircle the second lens accommodating part.

3. The camera module of claim 2, wherein a space is formed between the partition wall and the second lens accommodating part.

4. The camera module of claim 1, wherein the heating member is so disposed as to encompass the lens.

5. The camera module of claim 1, wherein a height of the heating member is lower than that of the second lens accommodating part.

6. The camera module of claim 1, wherein a lower surface of the second lens accommodating part is spaced apart from the substrate part.

7. The camera module of claim 6, wherein a lower surface of the second lens accommodating part is spaced apart from the substrate part.

8. The camera module of claim 2, wherein a part of the partition wall is disposed inside the housing.

9. The camera module of claim 1, wherein the heating member includes a resistor.

10. The camera module of claim 2, wherein the partition wall includes ribs projecting from an outer surface, and
wherein the ribs are provided in plurality and are spaced apart from each other.

11. The camera module of claim 2, wherein the lens module includes a guide protrusively formed from the base to a first direction, and a part of the guide is coupled to a groove formed on the housing.

12. The camera module of claim 11, wherein a projecting height of the guide from the base is formed lower than a projecting height of the partition wall from the base.

13. The camera module of claim 10, wherein a rib groove is formed on an inner surface of the housing so that the rib is engaged.

14. The camera module of claim 2, wherein a lower surface of the second lens accommodating part is disposed higher than a lower surface of the partition wall based on the upper surface of the substrate part.

15. The camera module of claim 1, wherein a guide rib is disposed in an edge region of the sensor seating portion.

16. The camera module of claim 1, wherein the substrate part includes a first substrate on which the image sensor is disposed on an upper surface, and a second substrate disposed below the first substrate, and
wherein the first substrate and the second substrate are electrically connected through a FPCB.

17. The camera module of claim 16, wherein a power supply unit includes one end electrically connected to the heating member and an other end electrically connected to the first substrate.

18. The camera module of claim 1, wherein a cross-sectional area of the second lens accommodating part is smaller than a cross-sectional area of the first lens accommodating part.

19. A camera module comprising:
a lens barrel in which a lens part is disposed;
a substrate part including a substrate that is disposed below the lens barrel;
an image sensor;
a housing coupled to the lens barrel; and
a heating member electrically connected to the substrate part,
wherein the lens barrel includes a lens accommodating portion in which a lens is disposed, a partition portion disposed outside the lens accommodating portion, and a groove disposed between the partition portion and the lens accommodating portion, wherein a sensor seating portion is disposed on a lower surface of the lens accommodating portion,
wherein the image sensor is spaced from the substrate part and located in the sensor seating portion, and
wherein the heating member is disposed in the groove.

* * * * *